United States Patent

Katter et al.

[11] 3,801,127
[45] Apr. 2, 1974

[54] CRASH RESTRAINT ASPIRATING INFLATION SYSTEM WITH CANTED NOZZLES

[75] Inventors: Lincoln B. Katter, Lynnwood; Lyle D. Galbraith, Redmond, both of Wash.

[73] Assignee: Rocket Research Corporation, Redmond, Wash.

[22] Filed: June 14, 1971

[21] Appl. No.: 152,894

[52] U.S. Cl. ............................ 280/150 AB, 417/179
[51] Int. Cl. ............................................. B60r 21/10
[58] Field of Search ...... 280/150 AB; 239/550, 556, 239/557, 560; 244/31; 60/270 S; 417/198, 417/180, 191, 179

[56] References Cited
UNITED STATES PATENTS

| | | | |
|---|---|---|---|
| 3,624,810 | 11/1971 | Hass | 280/150 AB |
| 3,460,746 | 8/1969 | Green et al. | 417/179 X |
| 3,411,807 | 11/1968 | Carey et al. | 280/150 AB |
| 2,072,599 | 3/1937 | Le Maitre | 417/179 X |
| 3,197,234 | 7/1965 | Bertrand | 280/150 AB |
| 3,632,132 | 1/1972 | Richardson | 280/150 AB |
| 3,632,133 | 1/1972 | Hass | 280/150 AB |
| 3,647,146 | 3/1972 | Genbauffe | 239/560 X |

Primary Examiner—Kenneth H. Betts
Assistant Examiner—David M. Mitchell
Attorney, Agent, or Firm—Graybeal, Barnard, Uhlir & Hughes

[57] ABSTRACT

A crash restraint device for an automobile comprising a box-like frame having a substantially closed sidewall and front and rear openings, an inflatable bag mounted at the rear opening; a plurality of high velocity aspirating jet units placed within said frame upstream of the bag. There is a single manifold tube extending across the box-like frame and three sets of individual jet units disposed in a diverging downstream pattern so as to provide a plurality of diverging downstream aspirating jet streams.

16 Claims, 7 Drawing Figures

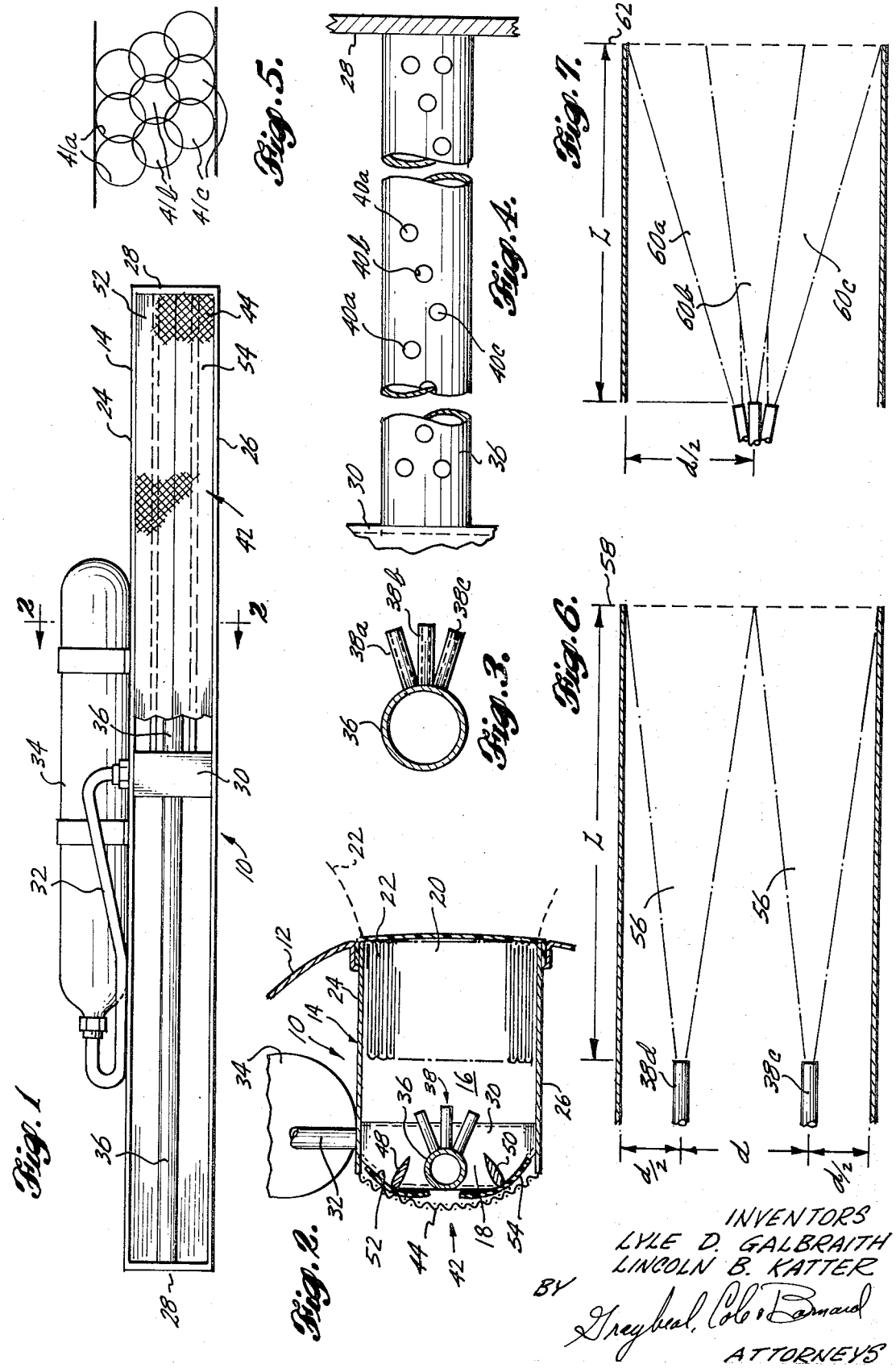

CRASH RESTRAINT ASPIRATING INFLATION SYSTEM WITH CANTED NOZZLES

BACKGROUND OF THE INVENTION

1. Field of the Invention

This invention relates to a crash restraint system in which a bag is inflated to prevent a passenger in an automobile from being thrown violently against the steering wheel, dashboard or other automobile structure.

There is a pending U.S. Pat. application, "Automobile Crash Restraint Apparatus", Ser. No. 84,266, inventors, Lincoln B. Katter and Michel W. Wells, and a continuation-in-part application of the same, Ser. No. 152,895 filed June 14, 1971 (per Paper No. 9). In those pending patent applications there is shown a crash restraint inflating system comprising a plurality of aspirating nozzles disposed in a passageway to provide aspirating jet streams in substantially parallel paths. These cause the inflation of a crash restraint inflatable in the automobile. The present invention relates to a modification of the invention disclosed and claimed in that pending application.

2. Description of the Prior Art

There are in the prior art various devices which cause a protective bag to inflate in front of a driver or passenger to cushion him from impact with the steering wheel, dashboard or other vehicle structure. Usually the device is activated by an inertial switch responsive to a crash impact of the automobile. This inertial switch in turn causes an inflating device to quickly inflate the collapsed bag into its inflated position deployed in front of the driver or passenger. The inflating gas is generally supplied either from a source of compressed air or other compressed gas, such as shown in U.S. Pat. No. 3,411,808; U.S. Pat. No. 3,414,031, and a number of other patents in the crash restraint field. Normally the compressed gas source is positioned adjacent the bag and discharges directly from an opening in the compressed gas container into the bag. In several other prior art patents (e.g., Kobori, U.S. Pat. No. 3,450,414; Teague et al; U.S. Pat. No. 3,532,359, and Selwa et al; U.S. Pat. No. 3,523,358) the bag is inflated by igniting a composition and directing the gaseous combustion products of the composition directly into the bag.

One of the major problems in such crash restraint systems is the "standing child" problem. To act as an effective cushion in a crash situation, the bag must be moved from its collapsed position to its inflated position in an extremely short period of time (in the order of 20 milliseconds). If one of the passengers (e.g., a child) happens to be leaning or standing against the dashboard when the bag inflates, the rapid expansion of the bag will throw the child backwards against the car seat. Therefore, the initial thrust of the expanding action of the bag must not be so violent as to hurl the person with such energy that the bag itself causes severe personal injury.

Another problem is the abrupt pressure increase generated in the car interior by the rapid expansion of the bag. Normally the interior of an automobile is reasonably airtight, and the sudden expansion of a bag causing a pressure shock in the car interior can possibly damage a person's eardrums.

Yet another problem in many of the prior art devices is the sound generated by the inflating system. This is generally a low frequency noise, sometimes in excess of 150 or 155 decibels, which, together with the sudden pressure increase in the car interior also can damage the occupant's eardrums or possibly otherwise do physical harm.

There are in the prior art a great many aspirating devices, and many of these are used to inflate life rafts and the like. Typical of these are Freygang, U.S. Pat. No. 2,399,670; Allen, U.S. Pat. No. 2,595,218; Bowman et al; U.S. Pat. No. 3,866,593; Kane, U.S. Pat. No. 2,975,958; Wilmar, U.S. Pat. No. 3,040,970; Fraibel, U.S. Pat. No. 3,042,290; Marsh et al; U.S. Pat. No. 056,540; Galiger et al; U.S. Pat. No. 3,086,848; Young et al; U.S. Pat. No. 3,158,314; Hadler, U.S. Pat. No. 3,204,862; and Day, U.S. Pat. No. 3,370,784. However, there is no teaching in these patents of adapting such devices for use in a crash restraint system.

SUMMARY OF THE INVENTION

The present invention is based upon the concept disclosed in the aforementioned pending U.S. Pat. application that the above problem areas can be alleviated to a significant degree by directing the inflating gas through an aspirating system to inflate the crash restraint bag. The present invention is a modification within the broader concept contained within that co-pending patent application.

In the present invention there is a plurality of aspirating units disposed in an aspirating passageway, with the jet units being disposed in a moderately diverging down-stream pattern, whereby the aspirating jet streams from these units diverge into a relatively wide aspirating pattern in the passageway. Such an arrangement properly accomplishes the inflating function, while permitting simplification and compactness of apparatus.

DESCRIPTION OF THE DRAWINGS

FIG. 1 is a front elevational view looking into the inlet of the apparatus of the present invention;

FIG. 2 is a sectional view taken along line 2—2 of FIG. 1;

FIG. 3 is an enlarged sectional view of the aspirating manifold and jet units of the present invention;

FIG. 4 is a view looking forwardly into the aspirating manifold, but showing only the outlet openings in the manifold tube itself;

FIG. 5 is a schematic view illustrating the pattern of the diverging aspirating paths of the aspirating jet streams at the exit plane of the aspirating passageway;

FIG. 6 is a sectional schematic showing of the L/d of aspirating jet units disposed in a parallel downstream direction; and FIG. 7 is a semi-schematic view similar to FIG. 6 illustrating the L/d of the aspirating unit of the present invention.

With reference to FIGS. 1 and 2, the apparatus 10 of the present invention is shown mounted beneath the dashboard 12 of an automobile. The apparatus 10 comprises a rectangular box-like frame 14 defining a through passageway 16 and having a front inlet 18 and a rear outlet 20. Mounted in the outlet portion 20 of the frame 14 is a bag 22 shown in full lines in its collapsed position. This bag 22 is adapted to be inflated to a position (shown partially in dotted lines) where it provides a protective cushion for an automobile occupant in a crash situation.

The frame 14 has top and bottom walls 24 and 26, respectively, and two sidewalls 28. At the center of the frame 14 is a manifold chamber 30 which is connected by a tube 32 to a source of compressed gas 34. Alternately, the source of compressed gas 34 can be a chemical composition which reacts to provide an aspirating gas, or a compressed gas source augmented by burning a chemical composition.

Extending laterally in opposite directions from the manifold chamber 30 are two horizontally aligned manifold tubes 36, each of which extends to a respective sidewall 28. Mounted to and directed downstream from each of the manifold tubes 36 are three sets of aspirating jet units 38a, 38b and 38c. The middle jet units 38b are directed parallel to the longitudinal downstream direction of the passageway 16 defined by the frame 14. The jet units 38a of the first set are directed in a downstream direction but canted off the longitudinal centerline at a moderate angle (between 10° to 30°, and desirably about 15°) with respect to the downstream direction of the passageway 16. The jet units 38c of the third set are canted moderately to the opposite side at approximately the same angle as the units 38a.

The three sets of jet units 38a, 38b and 38c, are spaced intermittently with respect to each other along the length of the two manifold tubes 36. This is illustrated in FIG. 4, wherein the outlet holes from the manifold tube are shown, absent the jet units 38 themselves. Thus, proceeding progressively along the length of the tube, there is a first outlet opening 40a, an adjacent outlet opening 40c, a next adjacent outlet opening 40b, and a next outlet opening 40a, which in turn is followed by outlet openings 40c, 40b, etc. As a high pressure jet of aspirating gas flows from the outlets 38a, b and c, these individual jet streams diverge outwardly at an angle of approximately 15° (i.e., total included angle) from each other. Thus, if one were to examine the pattern of the aspirating paths of these individual jet streams 41a, 41b, 41c at the transverse exit plane at the outlet opening 20, there would be a pattern such as that shown in FIG. 5 wherein the individual jet streams are arranged in three staggered rows encompassing substantially the entire outlet opening 20.

At the inlet opening 18 there is a check valve mechanism generally designated 42. This comprises a transverse screen 44 extending across the inlet 18. Adjacent the screen 44 and immediately rearward thereof are a pair of horizontal transverse fences 48 and 50, respectively. Attached to the front end of each of the fences 48 and 50 is a respective one of two flap members 52 and 54. These flaps 52 and 54 are made of a flexible material and are connected each to its respective fence 48 and 50 at its horizontal centerline. The two flaps 52 and 54 are so dimensioned that when positioned transversely against the screen 44, these flaps 52 and 54 close the front inlet 18. It is also possible to arrange the flaps to only partially close the inlet opening 18 to provide a vent opening to alleviate the "rebound" effect of the bag throwing the passenger rearwardly after cushioning the passenger from the crash impact.

To describe the operation of the present invention, let it be assumed that the automobile is in a crash situation. A suitable crash sensor (such as one of the inertial switches shown in the prior art) sends a signal to activate the aspirating gas source 34 to cause it to deliver high pressure gas to the manifold 30 and manifold tubes 36. High pressure aspirating gas then flows from the two tubes 36 out the jet units 38a, 38b and 38c. In the first millisecond or two of gas being emitted from the jets 38, there is a substantial back pressure from the inertia of the bag 22, which is just beginning to inflate. This back pressure causes the two flaps 52 and 54 of the valve assembly 42 to press against the screen 44 so as to close the front inlet opening 18.

As soon as the bag 22 begins to move outwardly into the passenger compartment of the automobile, the back pressure from the bag 22 is reduced, and the aspirating action of the jet units 38a, b and c causes a reduction of pressure in the inlet area 18 to cause the two flap members 52 and 54 to move forwardly against their respective fences 98 and 100 so as to open the passageway inlet 18 and permit aspirated air to flow into the frame passageway 16. This aspirated air mixes with the aspirating air jets from the units 38 to produce a resulting gas mixture which inflates the bag.

After about 30 milliseconds when the bag 22 is fully inflated, there is an increase in back pressure from the bag 22. This causes the flaps 52 and 54 to move back against the screen 96 so as to close the inlet 18.

The particular advantage of the present invention can be better understood with reference to FIGS. 6 and 7. FIG. 6 illustrates two rows of aspirating jet units 38d and 38e directed in parallel downstream paths. The aspirating jet stream 56 from each of these units 38d and 38e will meet at a location and engage the passageway sidewall approximately at an exit plane indicated at 58. To obtain proper aspirating action from the nozzles 38d and 38e, the aspirating passageway should extend to this location at 58. With that configuration, the length of the aspirating passageway indicated as "L[ must be at least four times the spacing of the two units 38d and 38e (which spacing is indicated at "d" in FIG. 6). Stated mathematically, the L/d must be at least four.

The aspirating pattern of the jet units 38a, b and c of the present invention is illustrated in FIG. 7. The three jet streams 60a, 60b and 60c from the three diverging jet units intersect one another and the passageway sidewall at a location 62. It can be seen that the length of the aspirating passageway relative to spacing of the jet units can be made considerably shorter (e.g., an L/d of about two and one-half) with the canted arrangement of the aspirating units, according to the present invention. This arrangement is particularly advantageous when dimensioning the inflating apparatus 10 for installation in an automobile where the passageway length is limited because of the particular design configuration of the interior of the automobile.

What is claimed is:

1. In combination with a vehicle having an interior within which is an occupant carrying location, structure spaced from said location, and a crash restraint apparatus for protecting an occupant in said location from impact with said structure, said apparatus comprising:
    a. a structure defining an aspirating passageway having an upstream inlet opening to admit an inflow of aspirating air and a downstream outlet opening,
    b. a collapsed inflatable mounted proximate said outlet opening and arranged to be inflated by gas flowing from said outlet opening to a position between said passenger location and said structure,
    c. a plurality of aspirating jet units, each having a discharge axis and disposed in said passageway to emit a plurality of aspirating jet streams in a downstream direction, and d. means to provide a short sustained velocity of gas from said jet units through said outlet, the improvement comprising a generally transverse manifold tube, a first set of jet units mounted to the manifold tube with their discharge axes directed generally parallel to said downstream direction, a second set of jet units mounted to the manifold tube with their discharge axes canted moderately to one side from said downstream direction, and a third set of jet units mounted to the manifold tube with their discharge axes canted moderately to a generally opposite side from said downstream direction, whereby said aspirating jet streams diverge to provide a relatively wide aspirating pattern in the passageway.

2. The improvement as recited in claim 1, wherein individual jet units from the three sets are spaced intermittently with respect to one another along said manifold tube, so that adjacent units have their discharge axes disposed divergently with respect to one another.

3. The improvement as recited in claim 1, wherein the discharge axes of said first, second and third sets of jet units are canted with respect to one another at angles between 10° to 30°.

4. The improvement as recited in claim 3, wherein the discharge axes of said first, second and third sets are canted with respect to one another at angles of about 15°.

5. The improvement as recited in claim 1, wherein there is a central manifold tube in said passageway and the discharge axes of said three sets of jet units are so disposed so as to provide an aspirating jet stream pattern across substantially all of said passageway.

6. In combination with an inflating apparatus adapted to inflate an inflatable such as a crash restraint inflatable, said apparatus comprising:

a. a structure defining an aspirating passageway having an upstream inlet opening to admit an inflow of aspirating air and a downstream outlet opening, b. a collapsed inflatable mounted proximate said outlet opening and arranged to be inflated by gas flowing from said outlet opening, c. a plurality of aspirating jet units each having a discharge axis and disposed in said passageway to emit a plurality of aspirating jet streams in a downstream direction, and d. means to provide a short sustained velocity of gas from said jet units through said outlet, the improvement comprising a generally transverse manifold tube, a first set of jet units mounted to the manifold tube with their discharge axes directed generally parallel to said downstream direction, a second set of jet units mounted to the manifold tube with their discharge axes canted moderately to one side from said downstream direction, and a third set of jet units mounted to the manifold tube with their discharge axes canted moderately to a generally opposite side from said downstream direction, whereby said aspirating jet streams diverge to provide a relatively wide aspirating pattern in the passageway.

7. The improvement as recited in claim 6, wherein individual jet units from the three sets are spaced intermittently with respect to one another along said manifold tube, so that adjacent units have their discharge axes disposed divergently with respect to one another.

8. The improvement as recited in claim 6, wherein the discharge axes of said first, second and third sets of jet units are canted with respect to one another at angles between 10° to 30°.

9. The improvement as recited in claim 8, wherein the discharge axes of said first, second and third sets are canted with respect to one another at angles of about 15°.

10. The improvement as recited in claim 6, wherein there is a central manifold tube in said passageway and the discharge axes of said three sets of jet units are so disposed so as to provide an aspirating jet stream pattern across substantially all of said passageway.

11. In an apparatus for inflating a crash restraint inflatable, which apparatus comprises a structure defining an aspirating passageway having an upstream inlet opening to admit an inflow of aspirating air and a downstream outlet opening adapted to direct inflating gas into an inflatable, and a plurality of aspirating jet units disposed in said passageway to emit a plurality of aspirating jet streams in a downstream direction, the improvement comprising a generally transverse manifold tube, and a plurality of sets of jet units mounted to said manifold tube, each of said jet units having a discharge axis with at least two sets of jet units having their discharge axes canted moderately outwardly with respect to said downstream direction, whereby said aspirating jet streams diverge to provide a relatively wide aspirating pattern in said passageway.

12. The improvement as recited in claim 11, wherein there is a first set of jet units mounted to the manifold tube with their discharge axes directed generally parallel to said downstream direction, a second set of jet units mounted to the manifold tube with their discharge axes canted moderately to one side from said downstream direction, and a third set of jet units mounted to the manifold tube with their discharge axes canted moderately to a generally opposite side from said downstream direction.

13. The improvement as recited in claim 12, wherein individual jet units from the three sets are spaced intermittently with respect to one another along said manifold tube, so that adjacent jet units have their discharge axes disposed divergently with respect to one another.

14. The improvement as recited in claim 12, wherein said first, second and third sets of jet units are arranged with their discharge axes canted with respect to one another at angles between 10° to 30°.

15. The improvement as recited in claim 14, wherein said first, second and third sets are arranged with their discharge axes canted with respect to one another at angles of about 15°.

16. The improvement as recited in claim 12, wherein there is a central manifold tube in said passageway and the discharge axes of said three sets of jet units are so disposed so as to provide an aspirating jet stream pattern across substantially all of said passageway.

* * * * *